(12) United States Patent
Saren

(10) Patent No.: US 7,190,597 B2
(45) Date of Patent: Mar. 13, 2007

(54) CONTROL OF AN INVERTER PULSE-WIDTH MODULATOR

(75) Inventor: Hannu Saren, Lappeenranta (FI)

(73) Assignee: Vacon OYJ, Vaasa (FI)

( * ) Notice: Subject to any disclaimer, the term of this patent is extended or adjusted under 35 U.S.C. 154(b) by 22 days.

(21) Appl. No.: 11/153,623

(22) Filed: Jun. 16, 2005

(65) Prior Publication Data
US 2005/0281060 A1    Dec. 22, 2005

(30) Foreign Application Priority Data
Jun. 17, 2004   (FI) .................................. 20040838

(51) Int. Cl.
*H02J 3/36*   (2006.01)
(52) U.S. Cl. ............................................. 363/35
(58) Field of Classification Search ................ 363/34, 363/35, 132
See application file for complete search history.

(56) References Cited

U.S. PATENT DOCUMENTS 5,535,113 A * 7/1996 Konishi .................... 363/35

FOREIGN PATENT DOCUMENTS

| DE | 44 28 682 A1 | 2/1996 |
|----|----|----|
| EP | 1 073 192 A2 | 1/2001 |
| EP | 1 496 605 A1 | 1/2005 |
| FI | 111201 B | 6/2003 |

* cited by examiner

*Primary Examiner*—Shawn Riley
(74) *Attorney, Agent, or Firm*—Birch, Stewart, Kolasch & Birch, LLP

(57) ABSTRACT

A modulation method for a pulse width modulator in the inverter section (11) of a frequency converter provided with a voltage intermediate circuit, said frequency converter comprising a single-phase mains bridge (10) to be connected to a single-phase alternating current source ($U_L$, N), a direct-voltage intermediate circuit and a controlled load bridge (11) for feeding a three-phase alternating voltage ($U_R$, $U_S$, $U_T$) of varying frequency and amplitude into a load (13), for controlling the semiconductor switches of the inverter section, in which low-capacitance direct-voltage intermediate circuit the waveform of the intermediate-circuit voltage in a normal load situation follows the absolute value of the supply network voltage, and wherein the modulation is implemented using an estimate value of the intermediate-circuit voltage to control the semiconductor switches of the inverter section.

10 Claims, 1 Drawing Sheet

CONTROL OF AN INVERTER PULSE-WIDTH MODULATOR

BACKGROUND OF THE INVENTION

1. Field of the Invention

The present invention relates to a method for controlling a pulse width modulator in the inverter of a PWM frequency converter provided with a voltage intermediate circuit and to a frequency converter provided with a pulse width modulator.

2. Description of Background Art

PWM frequency converters are generally used to feed electric motors when stepless control of the rotational speed of the motor is needed. FIG. 1 presents a PWM frequency converter connected to a 1-phase network to feed a three-phase load. It comprises a mains bridge 10 for rectifying the single-phase alternating voltage $U_L$, N, of the supply network to produce a DC intermediate-circuit direct voltage $U_{DC1}$ and a load bridge (inverter) 11 for inverting the DC intermediate-circuit direct voltage to produce a variable-frequency three-phase alternating voltage $U_R$, $U_S$, $U_T$, which can be used e.g. to feed a three-phase motor 13. The load bridge is a full-wave bridge with a control unit 12 controlling the semiconductor switches V11–V16 of each phase, each of the switches being connected in inverse-parallel with a free-wheeling diode D11–D16. The mains bridge 10 may be an uncontrolled full-wave bridge with upper and lower arm diodes D1–D4 connected to the phase and free-wheeling arms. As is well known, to limit mains current harmonics, PWM frequency converters use either an AC inductor $L_{AC}$ as presented in the figure or a DC inductor connected between the mains bridge and the intermediate-circuit capacitor $C_{DC}$.

A PWM inverter is used to produce a motor supply voltage whose amplitude and frequency can be adjusted independently of each other. The motor may be a cage induction motor or e.g. a permanent-magnet or separately excited synchronous motor. As is known, the control signals for controlling the semiconductor switches V11–V16 of the inverter bridge are generated in a PWM modulator by using e.g. sine-triangle comparison or vector modulation, such as space vector PWM. Space Vector PWM (SVPWM) is a pulse width modulation method especially well suited for digital implementation of the modulation of the inverter of a frequency converter provided with a voltage intermediate circuit, wherein the switching times for the switch positions of the inverter bridge are generally calculated by software. From the switching vectors used during a switching cycle, an output voltage space vector consistent with the reference value is formed as an average value.

Normally, the switching references for the inverter are generated utilizing a measured intermediate-circuit voltage value $U_{dc1}$, so the motor supply voltage is consistent with the reference value regardless of small variations in the intermediate-circuit voltage.

In frequency converters fed from a three-phase supply, the direct voltage circuit can be implemented by controlling the frequency converter e.g. according to patent specification FI 111201, in which case the capacitor in the direct voltage circuit will not serve as an intermediate energy storage and its voltage in the loaded state will follow the rectified supply network voltage. Thus, the capacitor is not needed to smooth the intermediate-circuit direct voltage, so it is possible to use capacitor of a considerably lower rating than conventional intermediate-circuit capacitors (typically only about 1% of the value of a conventional capacitor).

SUMMARY AND OBJECTS OF THE INVENTION

The present invention relates especially to this type of a modulation method for a pulse width modulator in the inverter section of a frequency converter provided with a small intermediate-circuit capacitor (to generate the switching references for the inverter bridge) in frequency converters fed from a 1-phase supply. It is characteristic of such a device that, in a loaded state of the device, the waveform $U_{dc1}$ of its intermediate-circuit voltage follows the instantaneous value of the rectified supply network phase voltage relatively accurately. Therefore, in the solution of the invention, the PWM switching references for the semiconductor switches are generated without measurement of the intermediate-circuit voltage, using a simple method of estimating the intermediate-circuit voltage. The object of the invention is to simplify the practical implementation of pulse-width modulation, i.e. to simplify the structure of the equipment without substantially compromising on the controllability of the motor.

In an embodiment of the modulation method of the invention, the estimate of the intermediate-circuit voltage is a constant voltage. In a second embodiment, an intermediate-circuit voltage value estimated on the basis of the phase angle of the measured mains voltage is used for compensating the modulation of the inverter.

The information regarding the phase angle of the supply mains voltage which is needed in the method of estimating the intermediate-circuit voltage according to the second embodiment can be produced in a simple way by using a zero voltage detector circuit and a phase-locked loop comprised in it, because the supply mains frequency varies very little.

In a method of estimating the intermediate-circuit voltage according to a third embodiment, the required information regarding the phase angle of the supply mains voltage can be produced on the basis of a motor current measurement.

The features of the modulation method of the invention and the corresponding modulator are presented in detail in the claims below.

The invention provides the following advantages:

The method requires no measurement of the intermediate-circuit voltage and therefore no galvanic isolation between the measuring circuit (basic circuit) and the control electronics.

By using the simplified modulation method of the invention, a nearly sinusoidal mains current waveform of the of the frequency converter fed from a 1-phase supply is achieved without separate circuits for compensating or improving the power factor.

By applying the invention, the oscillation of the stator voltage fed to the motor can be reduced.

Further scope of applicability of the present invention will become apparent from the detailed description given hereinafter. However, it should be understood that the detailed description and specific examples, while indicating preferred embodiments of the invention, are given by away of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
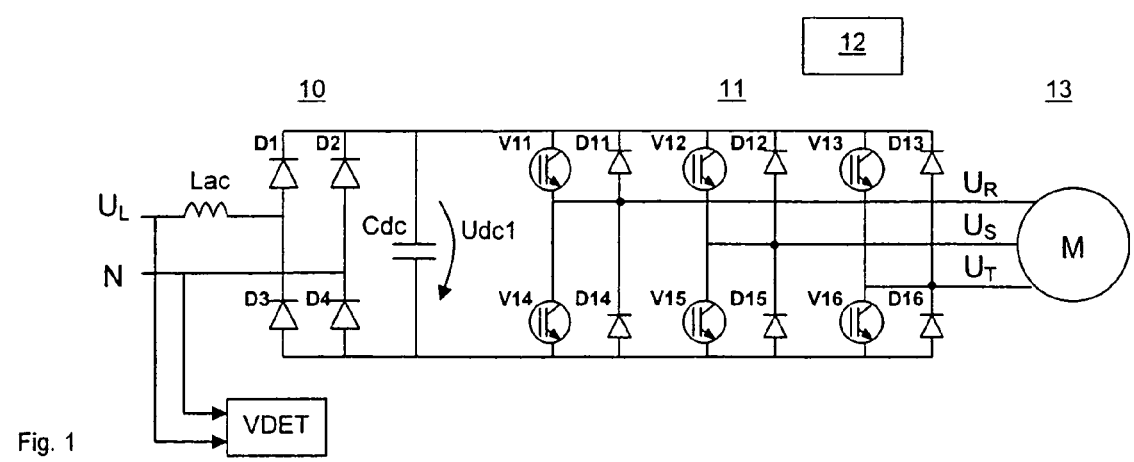
FIG. 1 presents a prior-art frequency converter fed from a 1-phase network.
Figure 2:
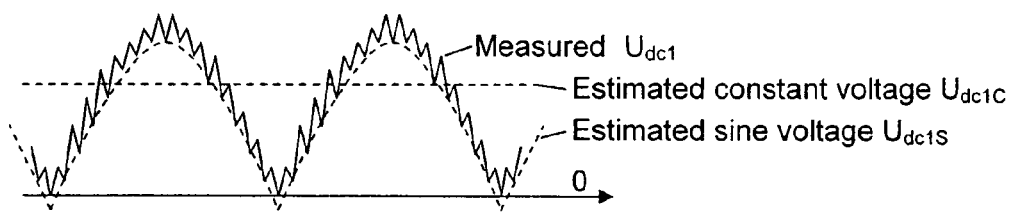
FIG. 2 presents the measured intermediate-circuit voltage of a frequency converter fed from a 1-phase network, and voltage estimates according to the invention.

In the solution of the invention in the frequency converter presented in FIG. 1, a small capacitor $C_{DC}$ is used in the intermediate voltage circuit. In a loaded state, due to the small intermediate-circuit capacitor, the intermediate-circuit voltage follows the rectified mains voltage and thus varies greatly. Thus, in the loaded state, the intermediate-circuit voltage $U_{dc1}$ can theoretically have values between 0 volts and the peak value of the supply phase voltage. FIG. 2 presents a diagram of the principle of the situation.

According to the invention, to allow the PWM modulation references to be calculated, an estimate is formed for the intermediate-circuit voltage. As shown in FIG. 2, the estimate used may consist of either the constant voltage $U_{dc1C}$ remaining constant and produced on the basis of the load or the intermediate-circuit voltage value $U_{dc1S}$ estimated on the basis of the phase angle of the measured mains voltage.

In the method of estimating the intermediate-circuit voltage according to the second embodiment, the information needed by the control unit regarding the phase angle of the supply network voltage is produced by means of a zero detector circuit VDET detecting the zero point of the voltage, which circuit may contain a phase-locked loop.

The method of estimating the intermediate-circuit voltage according to the third embodiment utilizes the fact that the motor current shows a strong component having a frequency equaling twice the supply frequency (e.g. 100 Hz when the supply frequency is 50 Hz). The information needed by the control unit regarding the phase angle of the supply network voltage is deduced from the phase angle of this current harmonic, which is seen from the current measurement of the frequency converter.

It is obvious to the person skilled in the art that different embodiments of the invention are not limited to the example described above, but that they may be varied within the scope of the claims presented below.

The invention claimed is:

1. A modulation method for a pulse width modulator in the inverter section (11) of a frequency converter provided with a voltage intermediate circuit, said frequency converter comprising a single-phase mains bridge (10) to be connected to a single-phase alternating current source ($U_L$, N), a direct-voltage intermediate circuit and a controlled load bridge (11) for feeding a three-phase alternating voltage ($U_R$, $U_S$, $U_T$) of varying frequency and amplitude into a load (13), for controlling the semiconductor switches of the inverter section, in which low-capacitance direct-voltage intermediate circuit the waveform of the intermediate-circuit voltage in a normal load situation follows the absolute value of the supply network voltage, characterized in that, in the modulation, an estimate value of the intermediate-circuit voltage is used to control the semiconductor switches of the inverter section.

2. A method according to claim 1,
characterized in that the estimate used is a constant voltage value determined on the basis of the load.

3. A method according to claim 1,
characterized in that the estimate used is an intermediate-circuit voltage value estimated on the basis of the phase angle of the measured supply network voltage.

4. A method according to claim 1,
characterized in that the information regarding the phase angle of the supply network voltage is produced by using zero detector circuit detecting the zero point of the supply network voltage.

5. A method according to claim 1,
characterized in that the information regarding the phase angle of the supply network voltage is produced on the basis of a current measurement of the frequency converter.

6. A frequency converter provided with a voltage intermediate circuit, said frequency converter comprising a single-phase mains bridge (10) to be connected to a single-phase alternating current source ($U_L$, N), a direct-voltage intermediate circuit and a controlled load bridge (11) for feeding a three-phase alternating voltage ($U_S$, $U_R$, $U_T$) of varying frequency and amplitude into a load (13), an inverter section (11) containing a pulse width modulator for controlling the semiconductor switches of the inverter section, in which low-capacitance direct-voltage intermediate circuit the waveform of the intermediate-circuit voltage in a normal load situation follows the absolute value of the supply network voltage, characterized in that the modulator contains a estimator which produces an estimate value of the intermediate-circuit voltage to control the semiconductor switches of the inverter section, said estimate value being used in the modulation.

7. A frequency converter according to claim 6,
characterized in that the estimate used is a constant voltage value determined on the basis of the load.

8. A frequency converter according to claim 6,
characterized in that the estimate used is an intermediate-circuit voltage value estimated on the basis of the phase angle of the measured supply network voltage.

9. A frequency converter according to claim 6,
characterized in that the frequency converter contains a zero detector circuit for detecting the zero point of the supply network voltage, the information produced by said circuit being used as a basis on which the information regarding the phase angle of the supply network voltage is generated.

10. A frequency converter according to claim 6,
characterized in that the control unit of the frequency converter produces the information regarding the phase angle of the supply network voltage on the basis of a current measurement.

* * * * *